US012037828B2

(12) United States Patent
Wesley

(10) Patent No.: US 12,037,828 B2
(45) Date of Patent: Jul. 16, 2024

(54) DOOR SYSTEM FOR A VEHICLE AND A VEHICLE COMPRISING A DOOR SYSTEM

(71) Applicants: Ningbo Geely Automobile Research & Development Co., Ltd., Ningbo (CN); Zhejiang Geely Holding Group Co., Ltd., Zhejiang (CN)

(72) Inventor: Kevin Wesley, Mölndal (SE)

(73) Assignees: Ningbo Geely Automobile Research & Development Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 17/962,151

(22) Filed: Oct. 7, 2022

(65) Prior Publication Data
US 2023/0039786 A1     Feb. 9, 2023

Related U.S. Application Data

(63) Continuation of application No. PCT/CN2021/085902, filed on Apr. 8, 2021.

(30) Foreign Application Priority Data

Apr. 27, 2020  (EP) .................................... 20171572

(51) Int. Cl.
*E05D 15/58* (2006.01)
*B60R 13/02* (2006.01)
*E05D 15/10* (2006.01)

(52) U.S. Cl.
CPC ........ *E05D 15/101* (2013.01); *B60R 13/0243* (2013.01); *E05D 15/58* (2013.01); *E05D 2015/586* (2013.01)

(58) Field of Classification Search
CPC .......... E05D 15/101; E05D 2015/1031; E05D 2015/1081; E05D 15/06; E05D 15/58
See application file for complete search history.

(56) References Cited

U.S. PATENT DOCUMENTS 2,956,836 A   10/1960  James
3,074,755 A    1/1963  Lucien
(Continued)

FOREIGN PATENT DOCUMENTS

CN    102733719 A   10/2012
CN    208152824 U   11/2018
(Continued)

OTHER PUBLICATIONS

International Search Report from International Application No. PCT/CN2021/085902, dated Jul. 16, 2021, 2 pages.

*Primary Examiner* — Janet M Wilkens
*Assistant Examiner* — Susan M. Heschel
(74) *Attorney, Agent, or Firm* — Tucker Ellis LLP

(57) ABSTRACT

A door system for a vehicle includes a vehicle body structure having an opening to an interior compartment of the vehicle and a door structure. The door system includes a displacement mechanism that displaces the door structure in relation to the opening between an open position and a closed position. In the closed position the door structure covers at least a portion of the opening, and in the open position is at a distance from the closed position in a longitudinal direction of the vehicle body structure. The door structure comprises a recess configured to receive at least a section of a wheel envelope of a wheel. The recess allows a door part of the door structure to cover the wheel in close vicinity to the vehicle body structure in a lateral direction of the vehicle body structure and prevents the wheel from contacting the door structure.

16 Claims, 7 Drawing Sheets

(56) References Cited

U.S. PATENT DOCUMENTS

| | | | | |
|---|---|---|---|---|
| 6,860,543 | B2* | 3/2005 | George | B60J 5/0479 |
| | | | | 49/248 |
| 7,658,438 | B1* | 2/2010 | Elliott | E05D 15/1081 |
| | | | | 296/155 |
| 7,717,493 | B2* | 5/2010 | Plavetich | B60J 5/06 |
| | | | | 296/146.7 |
| 9,022,455 | B2* | 5/2015 | Thiele | B60J 5/06 |
| | | | | 296/1.08 |
| 10,384,519 | B1 | 8/2019 | Brown | |
| 10,443,282 | B2* | 10/2019 | Bauer | E05D 15/1047 |
| 2005/0082871 | A1* | 4/2005 | Anders | E05F 15/638 |
| | | | | 296/155 |
| 2008/0100091 | A1* | 5/2008 | Kunishima | E05D 15/1081 |
| | | | | 296/146.1 |
| 2009/0200833 | A1 | 8/2009 | Heuel | |
| 2011/0047882 | A1 | 3/2011 | Thota | |
| 2015/0097391 | A1 | 4/2015 | Thiele | |
| 2017/0089110 | A1 | 3/2017 | Tavakoli-Targhi | |
| 2020/0148043 | A1* | 5/2020 | Kiryu | E05D 15/0621 |

FOREIGN PATENT DOCUMENTS

| | | |
|---|---|---|
| CN | 202645317 U | 1/2019 |
| CN | 109610968 A | 4/2019 |
| DE | 2435837 A1 | 2/1976 |
| EP | 2110277 A1 | 10/2009 |
| GB | 2441334 A | 3/2008 |
| JP | 2019006157 A | 1/2019 |

\* cited by examiner

DOOR SYSTEM FOR A VEHICLE AND A VEHICLE COMPRISING A DOOR SYSTEM

RELATED APPLICATION DATA

This application is a continuation of International Patent Application No. PCT/CN2021/085902, filed Apr. 8, 2021, which claims the benefit of European Patent Application No. 20171572.9, filed Apr. 27, 2020, the disclosures of which are incorporated herein by reference in their entireties.

TECHNICAL FIELD

The present disclosure relates to a door system for a vehicle comprising a vehicle body structure and a door structure. The vehicle body structure comprises an opening to an interior compartment of the vehicle, and the door system comprises a displacement mechanism configured for displacing the door structure in relation to the opening between an open position and a closed position. The door structure is in the closed position arranged to cover at least a portion of the opening, and the door structure is in the open position arranged at a distance from the closed position in a longitudinal direction of the vehicle body structure. The disclosure further relates to a vehicle comprising a door system.

BACKGROUND

There are currently two main types of door systems for vehicles on the market, traditional hinged door systems and sliding door systems. The door systems are covering an opening of a vehicle body structure, where the opening leads to an interior compartment of the vehicle. The door system comprises a displacement mechanism configured for displacing the door structure in relation to the opening between an open position and a closed position. Hinged doors are connected to the vehicle body structure via hinges or similar arrangements, and displaced in relation to the vehicle body structure between open and closed positions by a swinging movement. Sliding doors are instead mounted to or suspended in relation to the vehicle body structure via a track system, or a combined track and hinge system. The sliding doors are displaced in relation to the vehicle body structure between open and closed positions, by a sliding movement horizontally alongside the vehicle body structure.

Traditional hinged door systems are simple in construction but require a relatively large space outside the vehicle when being fully opened. Sliding door systems and other alternative door systems are becoming more popular due to the smaller space needed for the opening of the door compared to a hinged door solution. One problem with these alternative solutions is however that the door opening movement can be restricted by the necessary door or trim panel clearance to a wheel envelope of the vehicle. Current sliding door system solutions commonly use a mechanism in the sill area, which increases the height of the sill so that the step-over height for entering the interior compartment of the vehicle is higher than that of traditional hinged door systems. There is further a problem with sliding doors that the sliding movement of the door is restricted by the mechanism. There is a risk that the driver or passenger might step on and deforms the mechanism, which makes it impossible to close the door. The current sliding door proposals cause a break in the primary seal between the door and body, which is bad for leakage and NVH (noise, vibration, and harshness) properties. In addition, in the open position the interior door trim has to be clear of the wheel when turned to a maximum angle so the door can open in any situation. There is thus a need for an improved door system.

SUMMARY

An object of the present disclosure is to provide a door system and a vehicle comprising a door system where the previously mentioned problems are avoided. This object is at least partly achieved by the features of the independent claims. The dependent claims contain further developments of the door system.

The disclosure concerns a door system for a vehicle comprising a vehicle body structure and a door structure. The vehicle body structure comprises an opening to an interior compartment of the vehicle. The door system comprises a displacement mechanism configured for displacing the door structure in relation to the opening between an open position and a closed position. The door structure is in the closed position arranged to cover at least a portion of the opening, and the door structure is in the open position arranged at a distance from the closed position in a longitudinal direction of the vehicle body structure. The door structure comprises a recess configured to receive at least a section of a wheel envelope of a wheel of the vehicle when the door structure is arranged in the open position. The recess is in the open position allowing a door part of the door structure covering the wheel to be arranged in close vicinity to the vehicle body structure in a lateral direction of the vehicle body structure and preventing the wheel from contacting the door structure.

Advantages with these features are that the recess is preventing the wheel from contacting the door structure, which can be a problem with sliding door systems and other door systems, where the door opening movement can be restricted by the necessary trim panel clearance to a wheel envelope of the vehicle. The recess is providing a simple and efficient solution, where in the open position of the door system, the interior door trim is clear of the wheel when turned to a maximum angle. The door system can thus be opened in any situation. The door structure is suitably a vehicle front door arranged in connection to a steerable front wheel of the vehicle, where the door structure is configured for being slidably displaced from the closed position to the open position through a forward sliding movement and displaced from the open position to the closed position through a rearward sliding movement. The door structure may also be a rear door arranged in connection to a rear wheel of the vehicle. The rear wheel may be a steerable wheel or arranged as a non-steerable rear wheel. If the door structure is arranged as a rear door, the door structure is configured for being slidably displaced from the closed position to the open position through a rearward sliding movement and displaced from the open position to the closed position through a forward sliding movement.

According to an aspect of the disclosure, the door structure comprises a first trim panel part attached to the door structure and a second trim panel part movably arranged in connection to the first trim panel part. The first trim panel part comprises the recess, allowing the door structure to have a close alignment to the vehicle body structure of the vehicle and preventing the wheel from contacting the first trim panel part of the door structure in the open position. The first trim panel part with the recess is allowing the door part of the door structure covering the wheel to be arranged in close vicinity to the vehicle body structure in the lateral direction and is further preventing the wheel from contacting the door structure, independently of the wheel position. By arranging the first trim panel part with the recess, a simple and cost efficient construction of the door system is achieved. The first trim panel part and the movably arranged second trim panel part are forming a split interior door panel structure. The moving second trim panel part can be arranged to close a gap between the door structure and the vehicle body structure, which looks aesthetically attractive and is good from a safety perspective, where access to an area between the door structure and the vehicle body structure is prevented when the door is in the open position.

According to another aspect of the disclosure, the first trim panel part and the second trim panel part are facing an interior compartment of the vehicle in the closed position. The first trim panel part has an extension along the door structure in the longitudinal direction. The first trim panel part comprises a first section and a second section, where the first section comprises the recess.

According to an aspect of the disclosure, the first section comprises a first side wall and the second section comprises a second side wall. The first trim panel part further comprises a bridging wall section connecting the first side wall and the second side wall. The recess is formed as a cut-out section of the first trim panel part defined by the first side wall and the bridging wall section. The side walls are providing a simple construction of the first trim panel part with the recess formed as the cut-out section.

According to another aspect of the disclosure, the first section has a configuration with a smaller thickness in the lateral direction compared to the second section. The smaller thickness is securing a close alignment of the door structure in relation to the vehicle body structure and the wheel envelope, and the thinner part of the first section is forming the recess. With this construction, the amount the door structure can be opened increases.

According to an aspect of the disclosure, the recess is configured to receive the second trim panel part in the closed position. With this configuration of the door system, an efficient and compact design is achieved, where the volume of the recess is used for receiving the second trim panel part. In the closed position, the second trim panel part is integrated in the recess, which is providing an aesthetically attractive and slim design of the door structure.

According to another aspect of the disclosure, the second trim panel part is configured for preventing access to a space between the door structure and the vehicle body structure in the open position. The second trim panel part is blocking the space between the door structure and the vehicle body structure for increased safety. The second trim panel part is with the blocking functionality preventing a user of the vehicle from being injured when the doors are opened or closed.

According to a further aspect of the disclosure, the second trim panel part is aligned with the first trim panel part when the door structure is arranged in the closed position. The second trim panel part is arranged at an angle in relation to the first trim panel part when the door structure is arranged in the open position for closing a gap between the door structure and the vehicle body structure. The alignment of the second trim panel part in the closed position is establishing a compact design of the door structure. The arrangement at an angle in the open position is securing the blocking function of the second trim panel part, where access to the space between the door structure and the vehicle body structure is prevented.

According to an aspect of the disclosure, the displacement mechanism comprises a hinge unit. The hinge unit is hingedly connected to the vehicle body structure and hingedly and slidably connected to the door structure. The hinge unit is configured for slidingly displacing the door structure in relation to the vehicle body structure. With this construction, the door system can be constructed without any mechanism in the sill area, which is decreasing the step-over height for entering the interior compartment of the vehicle. There is thus no risk that the driver or passenger is stepping on, and deforms, the mechanism, making it impossible to close the door. The hinge unit is further allowing a continuous primary seal between the door structure and the vehicle body structure.

According to another aspect of the disclosure, the second trim panel part is attached to the hinge unit and configured to move with the hinge unit when the door structure is displaced in relation to the vehicle body structure between the open position and the closed position. With the attachment of the second trim panel part to the hinge unit, a simple and efficient arrangement for moving the second trim panel part in relation to the first trim panel part is established.

According to a further aspect of the disclosure, the hinge unit comprises an upper hinge and a lower hinge arranged between the door structure and the vehicle body structure. The two hinges are forming a simple construction with high stability, allowing the door to be efficiently displaced between the open and closed positions.

According to an aspect of the disclosure, the upper hinge and the lower hinge are extending between the door structure and the vehicle body structure, where the upper hinge and the lower hinge are having curved configurations. The curved configurations are used for a compact design of the door system. The hinges may for example be arranged with swan-neck like curved configurations replacing a traditional mechanism arranged in the sill area and improving the sliding operation of the door by allowing the door to open further. This is in turn improving the ingress or egress to the vehicle and is allowing an unbroken primary seal between the door structure and the vehicle body structure for better sealing and NVH properties.

According to another aspect of the disclosure, the door structure comprises an upper track and a lower track. The upper hinge is configured for sliding and pivoting in relation to the upper track, and the lower hinge is configured for sliding and pivoting in relation to the lower track.

According to a further aspect of the disclosure, the displacement mechanism further comprises an outer hinge, where the outer hinge is hingedly connected to the door structure and hingedly and slidably connected to the vehicle body structure. The outer hinge is extending between the door structure and the vehicle body structure. The vehicle body structure comprises an outer track, where the outer hinge is configured for sliding and pivoting in relation to the outer track. The outer hinge is configured for slidingly displacing the door structure in relation to the vehicle body structure. The outer hinge together with the upper and lower hinges are forming a simple construction with even further increased stability, allowing the door structure to be efficiently displaced between the open and closed positions.

According to an aspect of the disclosure, the door structure further comprises an upper trim panel part arranged above the first trim panel part, where the upper trim panel part is forming an upper wall for the recess. The upper trim panel part is providing an aesthetically attractive interior design of the door structure and is at the same time forming the upper wall for the recess.

The disclosure further concerns a vehicle comprising the door system described above.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIGS. 1A-1C, 2A-2C, 3, and 4, schematically show a door system 1 and parts of a door system 1 for a vehicle V. The door system 1 of the vehicle V comprises a vehicle body structure 3 and a door structure 2. The vehicle body structure 3 comprises an opening O to an interior compartment I of the vehicle V. The vehicle V comprises the door system 1, and the door system 1 is providing access to the interior compartment I via the opening O. The door system 1 is further arranged to close the opening O during use or non-use of the vehicle V.

Figure 1A:
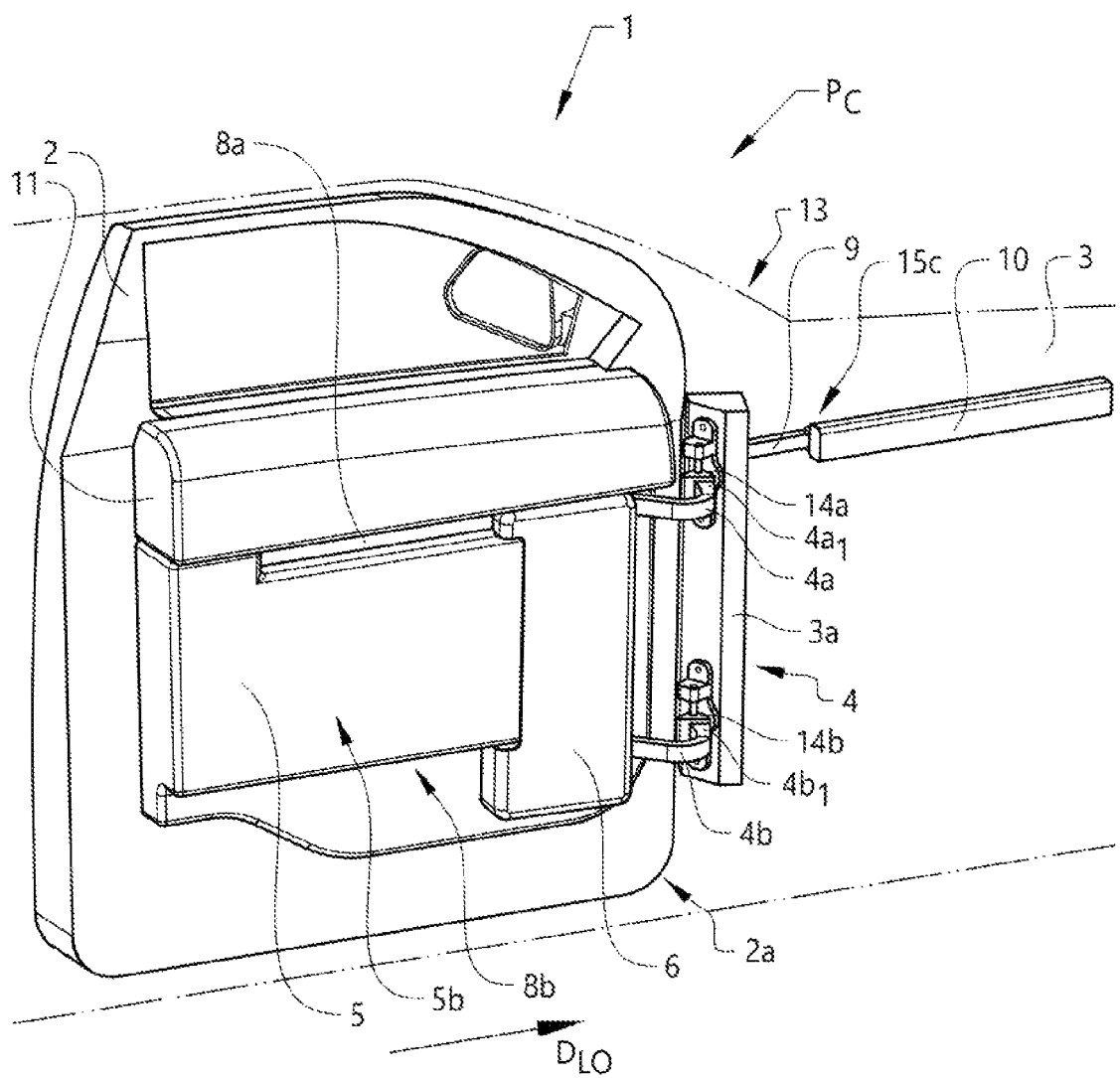
FIGS. 1A-1C show schematically, in a perspective view, parts of a door system in a closed position, in an intermediate position, and in an open position, according to the disclosure.
Figure 1B:
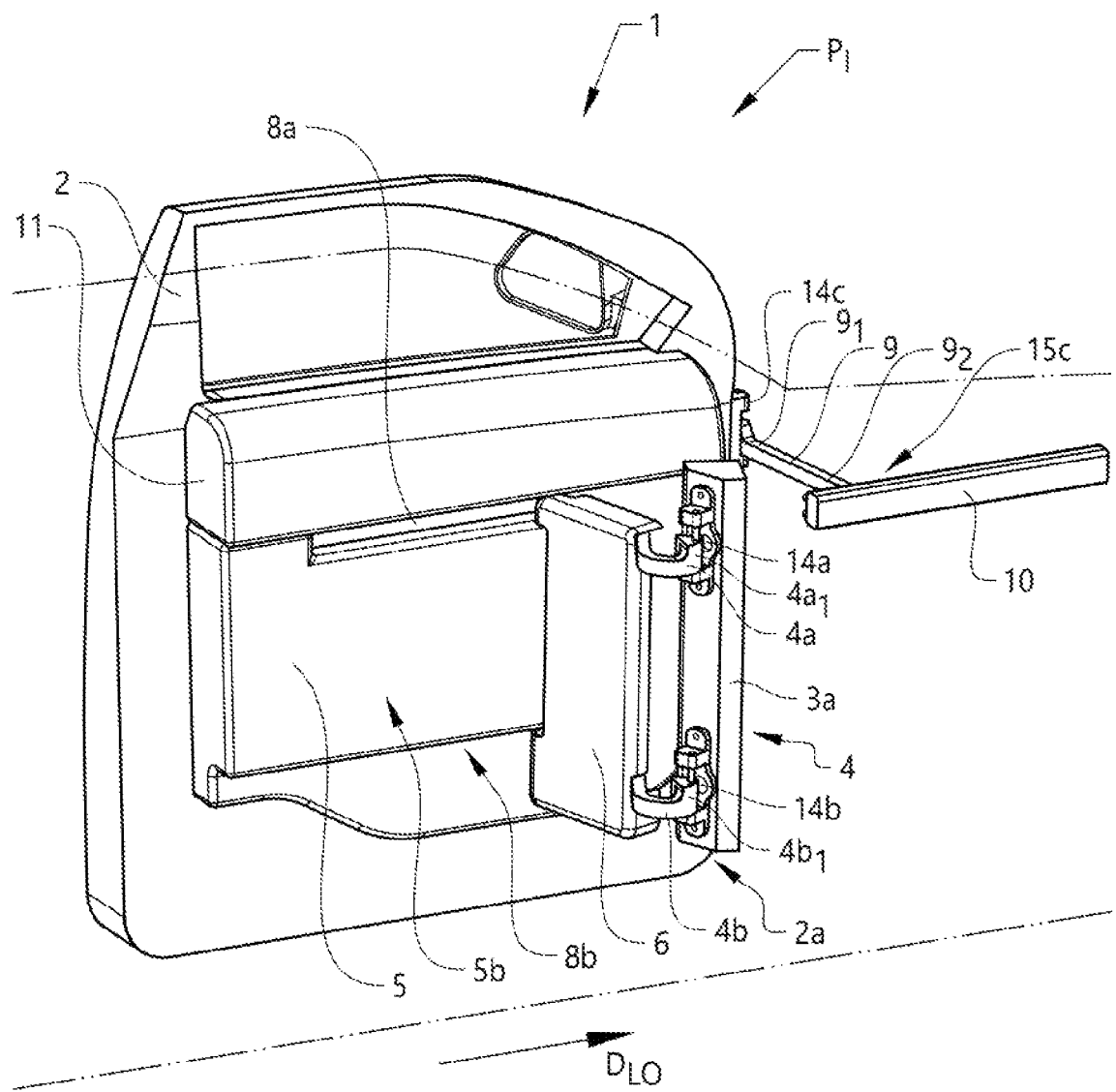
Figure 1C:
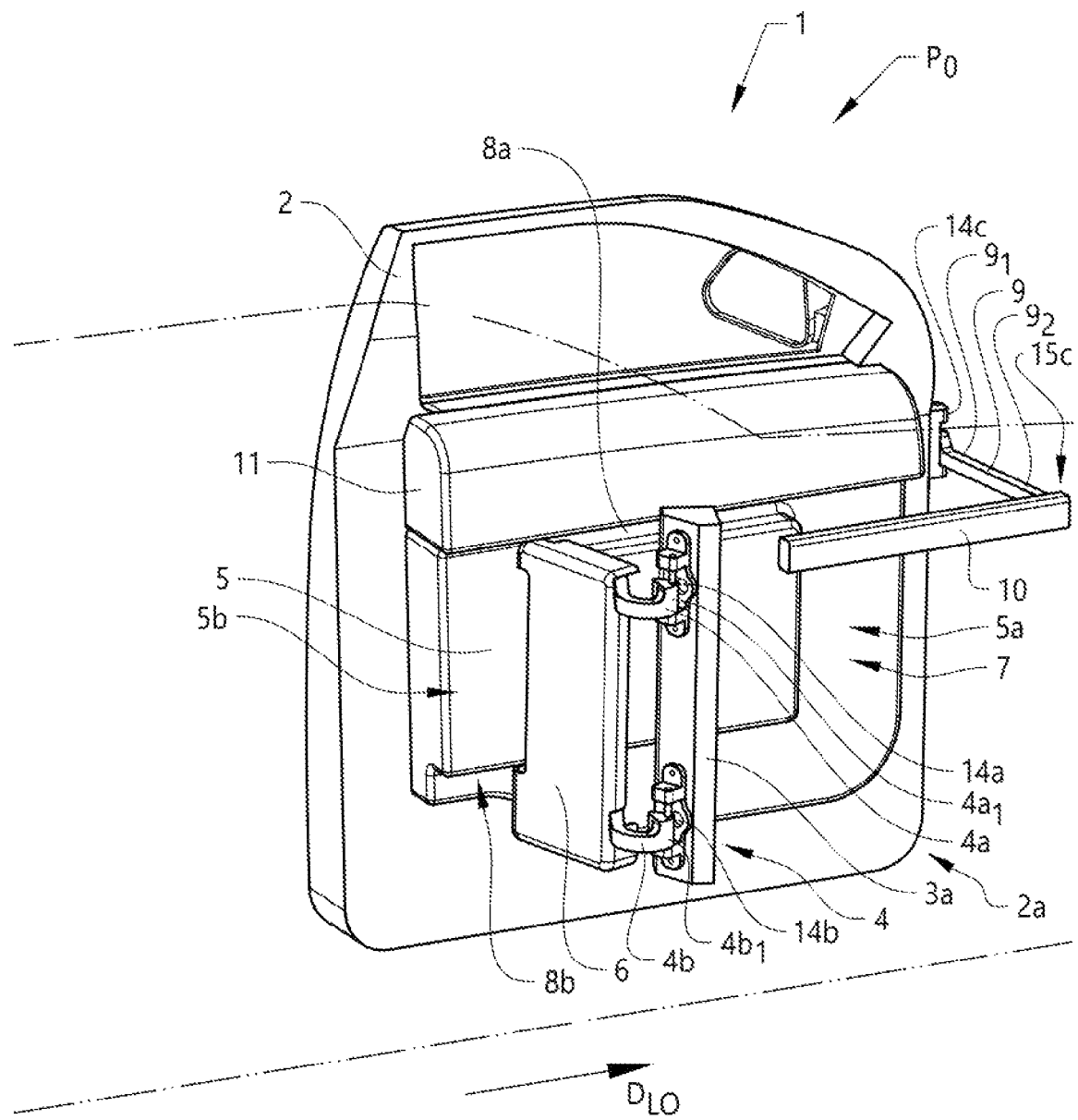
Figure 2A:
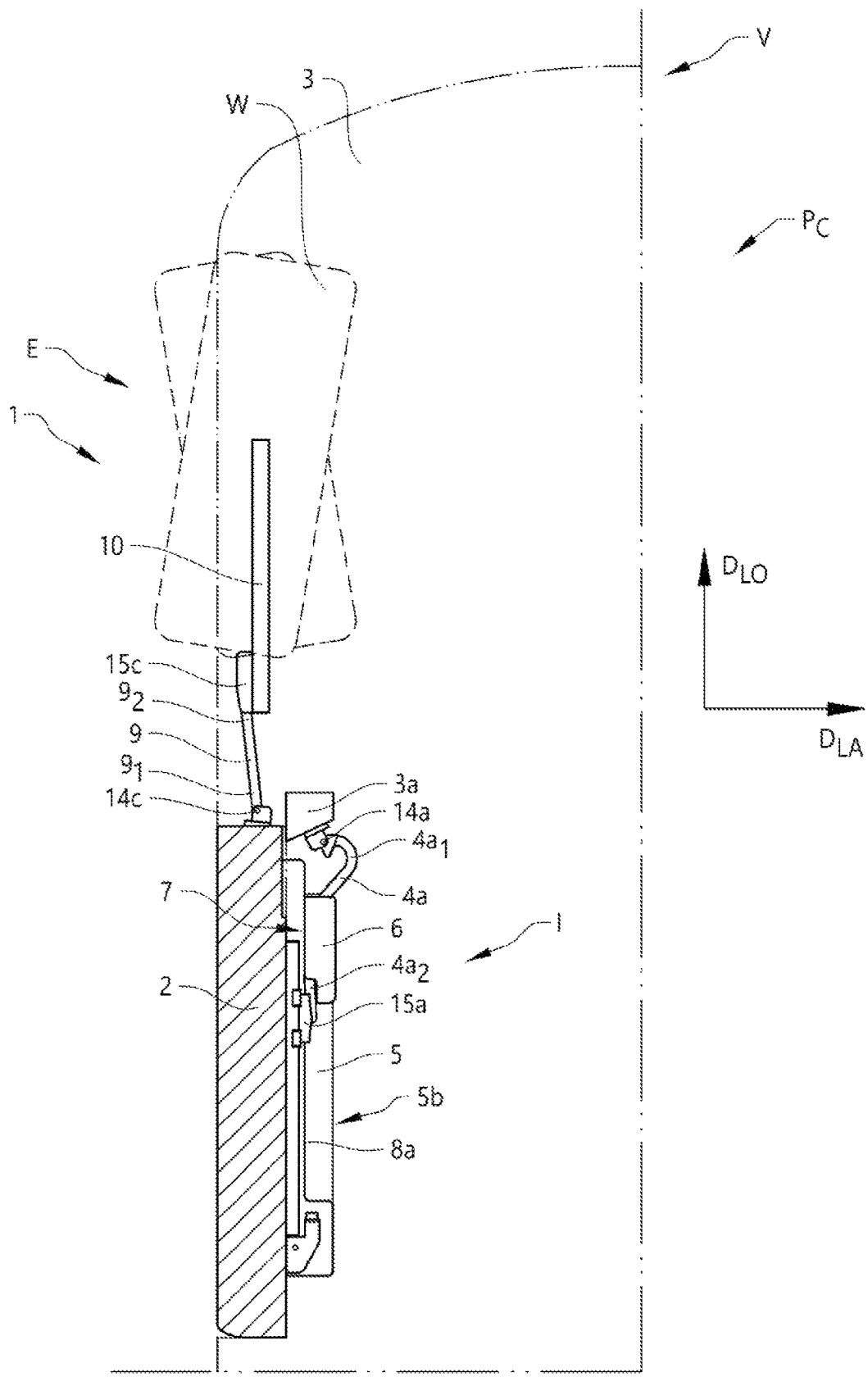
FIGS. 2A-2C show schematically, in a view from above, the door system in a closed position, in an intermediate position, and in an open position, according to the disclosure.
Figure 2B:
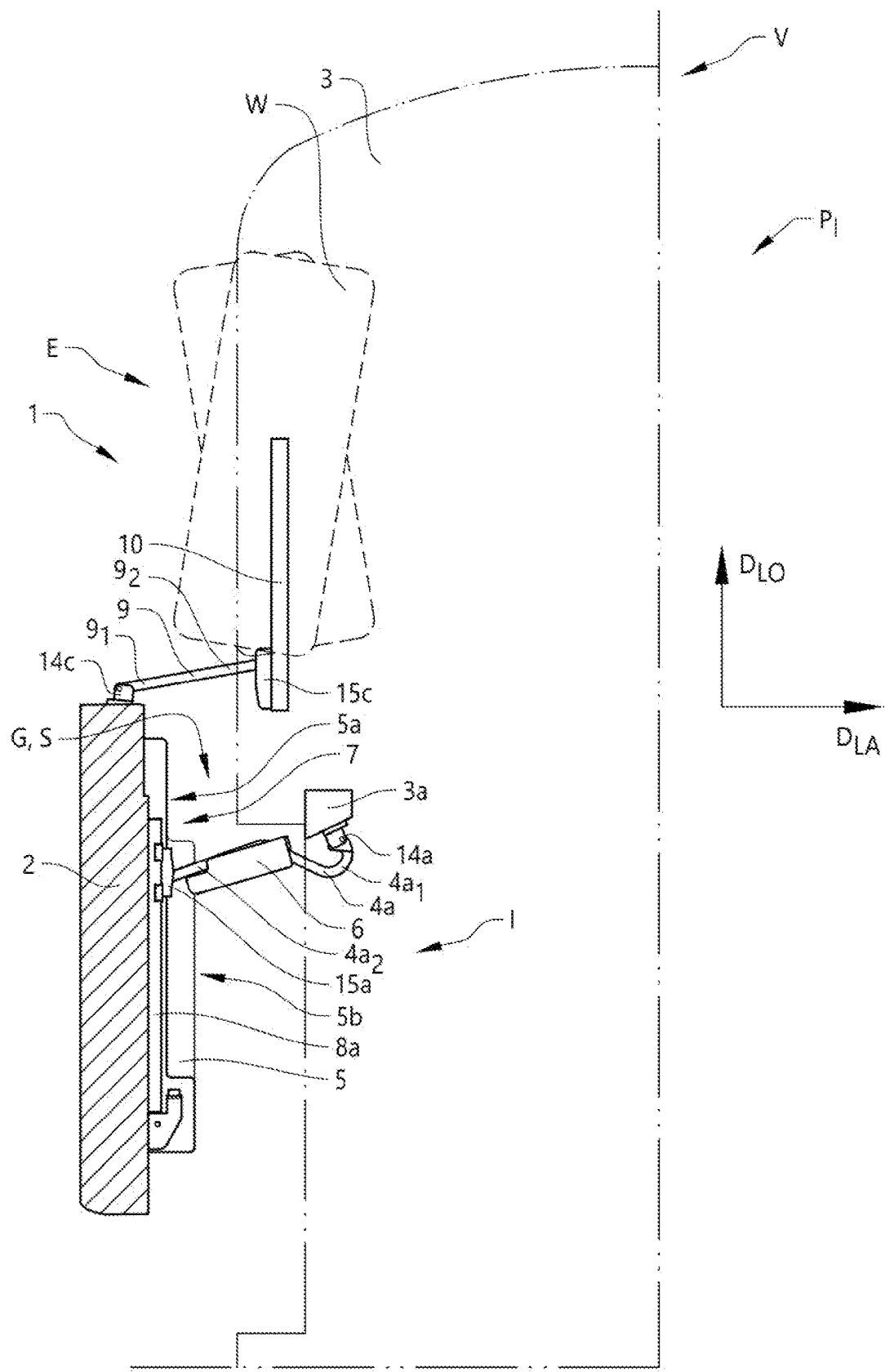
Figure 2C:
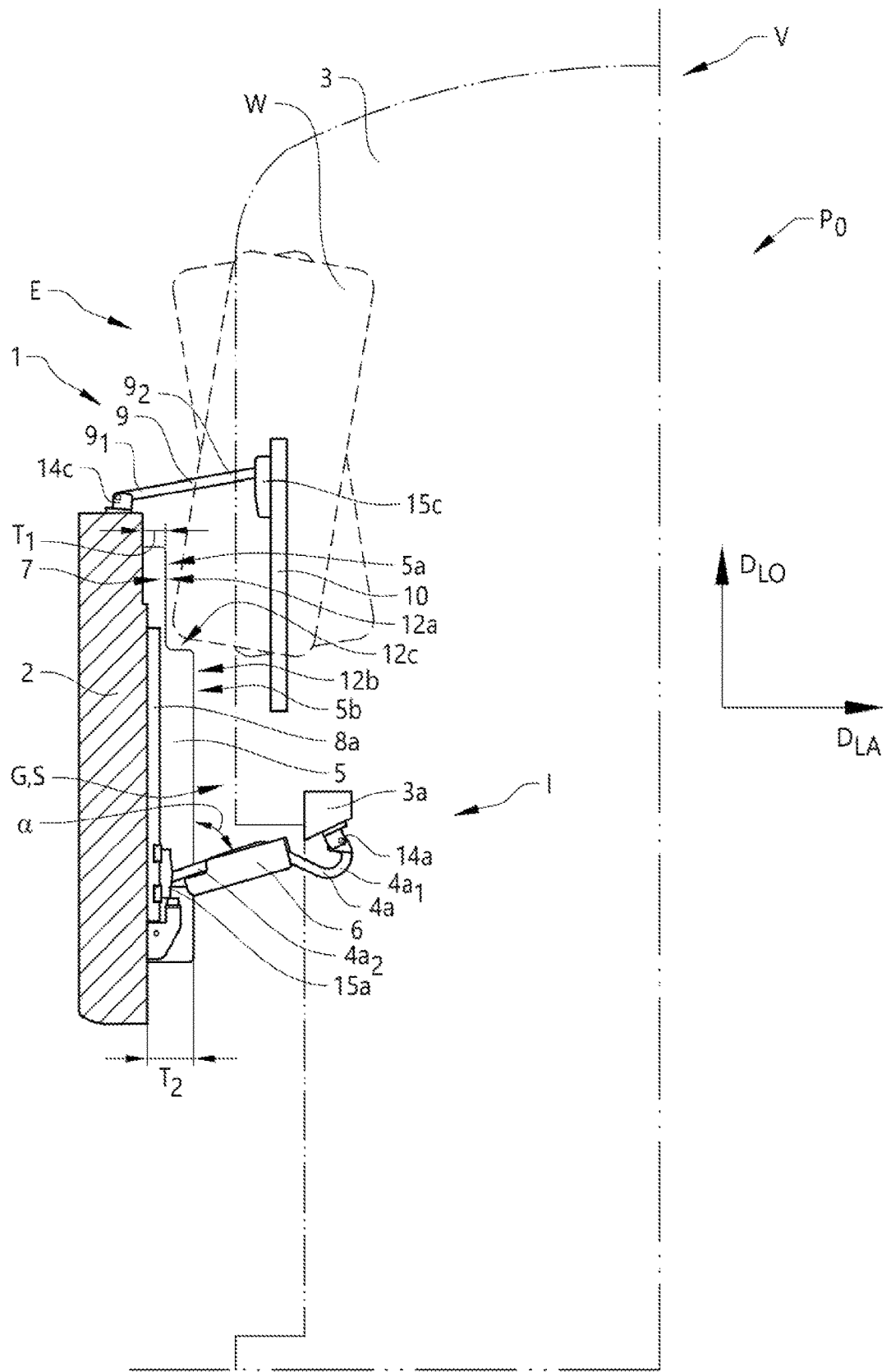

The door system 1 further comprises a displacement mechanism 13 configured for displacing the door structure 2 in relation to the opening O of the vehicle body structure between an open position $P_O$, as schematically illustrated in FIGS. 1C and 2C, and a closed position $P_C$, as schematically illustrated in FIGS. 1A and 2A. In FIGS. 1B and 2B, the door structure 2 is arranged in an intermediate position $P_1$ between the open position $P_O$ and the closed position $P_C$. The door structure 2 is in the closed position $P_C$ arranged to cover at least a portion of the opening O. The opening O may, depending on the design of the vehicle V be configured for matching one or more corresponding door structures. Most commonly, the opening O is arranged as a one door opening, where the door structure 2 is fully covering the opening O in the closed position. Some vehicle designs have openings O that are covered by two door structures 2, such as an opening O without a B-pillar with a front door and a rear door, where the two door structures together are fully covering the opening O in the closed positions of the doors. As illustrated in FIGS. 2A-2C, the door structure 2 is in the open position $P_O$ arranged at a distance from the closed position $P_C$ in a longitudinal direction $D_{LO}$ of the vehicle body structure 3. The door structure 2 is thus displaced between the closed and open positions in the longitudinal direction $D_{LO}$, through for example a sliding movement as will be further described below.

The longitudinal direction $D_{LO}$ of the vehicle body structure 3 is defining the longitudinal direction of the door system 1. When reference is made in the disclosure to a longitudinal direction $D_{LO}$, a direction parallel to the longitudinal direction $D_{LO}$ of the vehicle body structure 3 is meant. The longitudinal direction $D_{LO}$ of the vehicle body structure 3 is thus used for defining the longitudinal direction $D_{LO}$ of the door system 1, including the vehicle body structure 3, the door structure 2, and other structural components involved.

As schematically shown in for example FIGS. 1C, 2A-2B and 3, the door structure 2 comprises a recess 7. The recess 7 is configured to receive at least a section of a wheel envelope E of a wheel W of the vehicle V when the door structure 2 is arranged in the open position $P_O$, as shown in FIGS. 2C and 4. In the open position $P_O$, the recess 7 is allowing a door part 2a of the door structure 2 covering the wheel W to be arranged in close vicinity to the vehicle body structure 3 in a lateral direction $D_{LA}$ of the vehicle body structure 3 and preventing the wheel W from contacting the door structure 2.

The lateral direction $D_{LA}$ of the vehicle body structure 3 is defining the lateral direction of the door system 1. When reference is made in the disclosure to a lateral direction $D_{LA}$, a direction parallel to the lateral direction $D_{LA}$ of the vehicle body structure 3 is meant. The lateral direction $D_{LA}$ of the vehicle body structure 3 is thus used for defining the lateral direction $D_{LA}$ of the door system 1, including the vehicle body structure 3, the door structure 2, and other structural components involved.

In automotive design, the wheel envelope E is defining all positions a wheel and tire combination may be expected to occupy during driving and standstill of a vehicle. This will take into account the maximum jounce and rebound allowed by a suspension system of the vehicle, and the maximum turn and tilt allowed by a steering mechanism of the vehicle. Minimum and maximum tire inflation pressures and tire wear conditions may also be considered when generating the wheel envelope E. The wheel envelope E may for example be compared with the wheel housing and other components in the wheel area to perform an interference or collision analysis during the vehicle design process. The results of such an analysis tell vehicle designers whether that wheel and tire combination will strike the housing and components under normal driving and standstill conditions. The wheel envelope E is for illustrative purposes schematically indicated in a view from above in FIGS. 2A-2C.

As shown in the illustrated embodiment, the door structure 2 is arranged as vehicle front door arranged in connection to the wheel W, where the wheel W is a steerable front wheel W of the vehicle. If arranged as a front door, the door structure 2 is configured for being slidably displaced from the closed position $P_C$ to the open position $P_O$ through a forward sliding movement and displaced from the open position $P_O$ to the closed position $P_C$ through a rearward sliding movement, as illustrated in FIGS. 1A-1C and 2A-2C. In an alternative non-illustrated embodiment, the door structure 2 may also be a rear door arranged in connection to a rear wheel of the vehicle. The rear wheel may be a steerable wheel or arranged as a traditional non-steerable rear wheel. If arranged as a rear door, the door structure 2 is configured for being slidably displaced from the closed position $P_C$ to the open position $P_O$ through a rearward sliding movement and displaced from the open position $P_O$ to the closed position $P_C$ through a forward sliding movement. The vehicle may be arranged with both front and rear door structures according to the disclosure if suitable.

The door structure 2 comprises a first trim panel part 5 attached to the door structure 2 and a second trim panel part 6 movably arranged in connection to the first trim panel part 5, as schematically illustrated in FIGS. 1A-1C and 3. The first trim panel part 5 comprises the recess 7, and the recess is allowing the door structure 2 to have a close alignment to the vehicle body structure 3 of the vehicle V and preventing the wheel W from contacting the first trim panel part 5 of the door structure 2 in the open position $P_O$, as shown in FIG. 2C. In FIG. 2C, the wheel W is schematically shown in a most turned position, where it is not possible to turn the wheel further in that direction. In the illustrated embodiment in FIG. 2C, the wheel W is shown as a left front wheel of the vehicle V, with a maximum turn in a direction for a right turning operation of the vehicle V. The illustrated position of the wheel in FIG. 2C is the most critical one for risking contact with the door structure, and as illustrated, the wheel W is not in contact with the door structure 2 thanks to the recess 7. The recess 7 is thus preventing contact between the wheel W and the door structure 2, and is providing a close alignment of the door structure 2 to the vehicle body structure 3. Further, the recess 7 is allowing the door part 2a of the door structure 2 covering the wheel W to be arranged in close vicinity to the vehicle body structure 3 in the lateral direction $D_{LA}$.

The first trim panel part 5 and the second trim panel part 6 are facing the interior compartment I of the vehicle V in the closed position $P_C$, as shown in FIG. 2A. wherein the first trim panel part 5 has an extension along the door structure 2 in the longitudinal direction $D_{LO}$, and the first trim panel part 5 comprises a first section 5a and a second section 5b, wherein the first section 5a comprises the recess 7, as shown if FIG. 2C.

As for example illustrated in FIG. 2C, the first section 5a of the first trim panel part 5 comprises a first side wall 12a, and the second section 5b of the first trim panel part 5 comprises a second side wall 12b. The first trim panel part 5 further comprises a bridging wall section 12c connecting the first side wall 12a and the second side wall 12b, wherein the recess 7 is formed as a cut-out section of the first trim panel part 5 defined by the first side wall 12a and the bridging wall section 12c.

To form the recess 7, the first section 5a of the first trim panel part 5 has a configuration with a smaller thickness in the lateral direction $D_{LA}$ compared to the second section 5b of the first trim panel part 5. As shown in FIG. 2C, the first section 5a has a first thickness $T_1$ in the lateral direction $D_{LA}$ and the second section 5b has a second thickness Ta in the lateral direction $D_{LA}$, where the first thickness $T_1$ is smaller than the second thickness Ta. In should be understood that the first trim panel part 5 may have other designs and configurations than the one in the illustrated embodiment. The surfaces may for example be curved or arranged with other shapes than the shown planar configurations. Even with other designs, the first thickness $T_1$ may be smaller than the second thickness Ta to form the recess 7.

The recess 7 has suitably a shape that is corresponding to the shape of the second trim panel part 6. With such a construction, the recess 7 is configured to receive, at least partly, the second trim panel part 6 in the closed position $P_C$, as shown in FIGS. 1A and 2A. The recess 7 may be designed to fully receive the second trim panel part 7 if desired, depending on the design of the door structure 2. An efficient and compact design is achieved with this configuration of the door system 2, where the volume of the recess 7 is used for receiving the second trim panel part 6. In the closed position $P_C$, the second trim panel part 6 is integrated in the recess 7, which is providing an aesthetically attractive and slim design of the door structure 2. The first trim panel part 5 and the second trim panel part 6 may thus be arranged to form a flat interior surface of the door structure 2 in the closed position $P_C$, where the second trim panel part 6 is aligned with the first trim panel part 5 when the door structure 2 is arranged in the closed position $P_C$. The alignment of the second trim panel part 6 in the closed position $P_C$ is further establishing a compact design of the door structure.

In the open position $P_O$, as illustrated in FIGS. 1C and 2C, the second trim panel part 6 is configured for preventing access to a space S between the door structure 2 and the vehicle body structure 3 in the open position $P_O$. The second trim panel part 6 is blocking the space S between the door structure 2 and the vehicle body structure 3 for increased safety. The second trim panel part 6 is with the blocking configuration preventing a user of the vehicle from being injured when the doors are opened or closed. As shown in FIG. 2C, the second trim panel part 6 is arranged at an angle α in relation to the first trim panel part 5 when the door structure 2 is arranged in the open position $P_O$ for closing a gap G formed by the space S between the door structure 2 and the vehicle body structure 3. The arrangement at an angle α in the open position $P_O$ is securing the blocking function of the second trim panel part 6, where access to the space S between the door structure and the vehicle body structure is prevented. The angle α may vary depending on the design of the door structure and may be chosen to suit a specific door construction.

As described above, the door system comprises the displacement mechanism 13. The displacement mechanism 13 is configured for slidingly displacing the door structure 2 in relation to the vehicle body structure 3, providing a sliding door arrangement attached to the vehicle body structure 3.

The displacement mechanism 13 comprises a hinge unit 4, as shown in FIGS. 1A-1C, 2A-2C, and 3. The hinge unit 4 is hingedly connected to the vehicle body structure 3 and hingedly and slidably connected to the door structure 2. With this arrangement, the hinge unit 4 is configured for slidingly displacing the door structure 2 in relation to the vehicle body structure 3, as shown in for example FIGS. 2A-2C, where the door structure is slidingly displaced between the closed position $P_C$, the intermediate position $P_1$, and the open position $P_O$.

In the illustrated embodiment, the second trim panel part 6 is attached to the hinge unit 4 and configured to move with the hinge unit 4 when the door structure 2 is displaced in relation to the vehicle body structure 3 between the open position $P_O$ and the closed position $P_C$, as shown in FIGS. 1A-1C and 2A-2C. With the attachment of the second trim panel part 6 to the hinge unit 4, a simple and efficient arrangement for moving the second trim panel part 6 in relation to the first trim panel part 5 is established. In the closed position $P_C$ the second trim panel part 6 together with the hinge unit 4 are integrated in the recess 7, and in the open position $P_O$ the second trim panel part 6 is preventing access to the space S or gap G between the door structure 2 and the vehicle body structure 3 through the attachment to the hinge unit 4. The attachment of the second trim panel part 6 to the hinge unit 4 is providing a simple and efficient arrangement for moving the second trim panel part 6 in relation to the first trim panel part 5.

As illustrated in FIGS. 1A-1C, and 3, the hinge unit 4 comprises an upper hinge 4a and a lower hinge 4b arranged between the door structure 2 and the vehicle body structure 3. Each of the upper hinge 4a and the lower hinge 4b is hingedly connected to the vehicle body structure 3 and hingedly and slidably connected to the door structure 2, and the hinges are configured for slidingly displacing the door structure 2 in relation to the vehicle body structure 3. The upper hinge 4a and the lower hinge 4b are extending between the door structure 2 and the vehicle body structure 3, and are cooperating for displacing the door structure 2. It should be understood that more than two hinges may be used, depending on the construction of the door system 1.

A first end $4_{a1}$ of the upper hinge 4a is hingedly connected to a pillar structure 3a, or other structure of the vehicle body structure 3, via a suitable upper pivoting connection member 14a, such as for example a conventional hinge axis construction, as indicated in FIGS. 1A-1C. With this construction, the first end $4_{a1}$ of the upper hinge 4a can pivot in relation to the vehicle body structure 3 for displacing the door structure 2.

In the shown embodiment, the upper hinge 4a is having a curved configuration for an efficient displacement of the door structure 2 in relation to the vehicle body structure 3. As shown in FIGS. 1A-1C, 2A-2C, and 3, the first end $4_{a1}$ of the upper hinge 4a is arranged with a curved shape, such as a swan-neck like curved configuration for a compact design of the door system 2. The upper hinge 4a may have other suitable configurations if desired.

Figure 3:
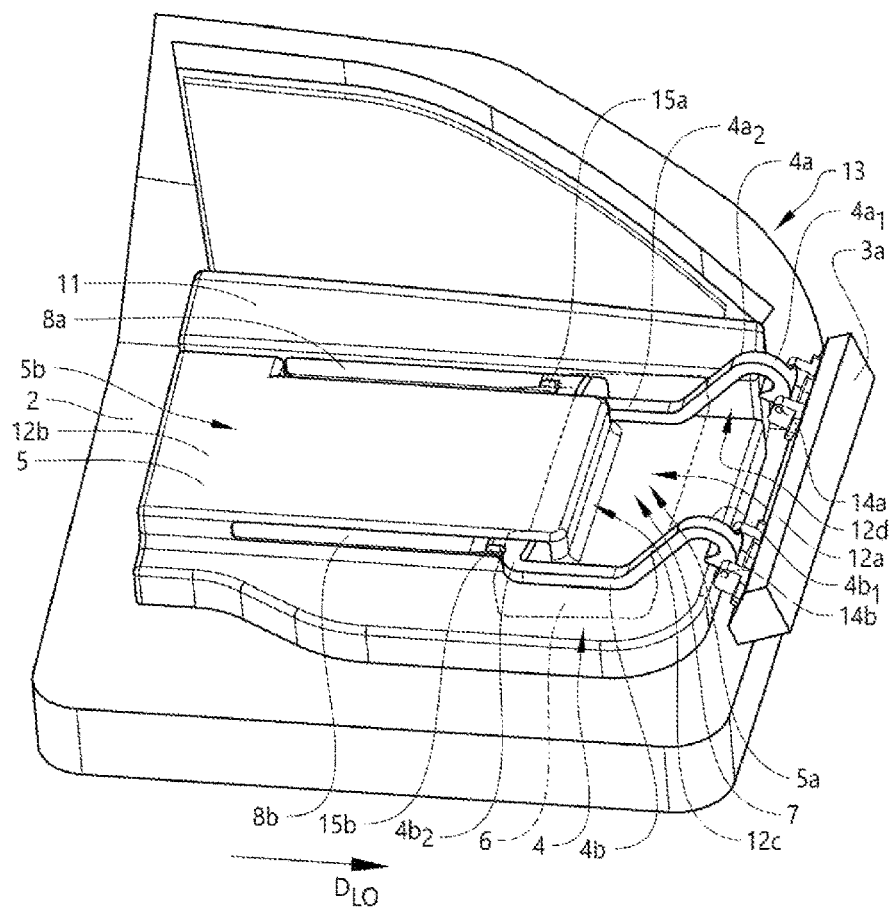
FIG. 3 shows schematically, in a perspective view from below, a door structure with a hinge unit of the door system, according to the disclosure.
Figure 4:
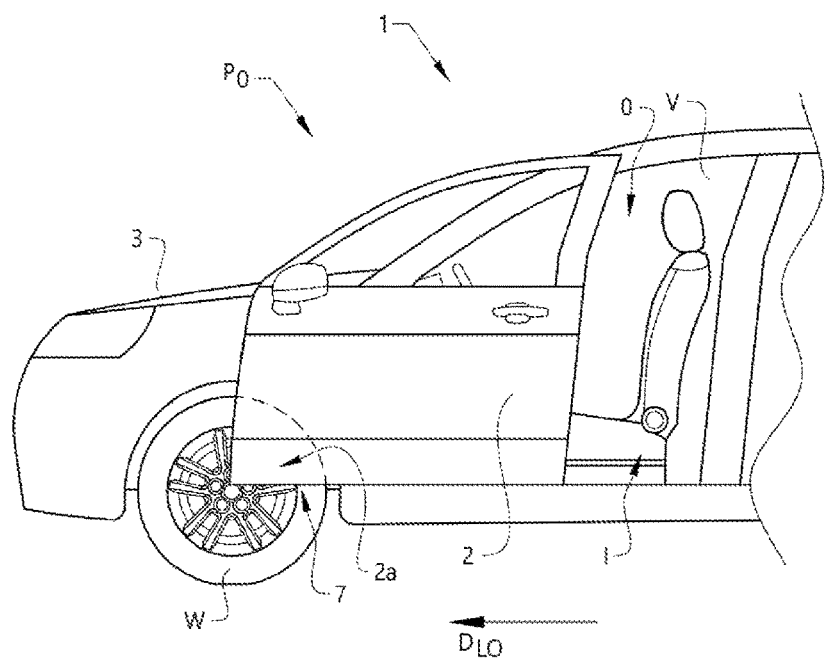
FIG. 4 shows schematically, in an external vehicle side view, the door system in an open position according to the disclosure.

As further shown in FIGS. 1A-1C, 2A-2C, and 3, the door structure 2 comprises an upper track 8a, and the upper hinge 4a is configured for sliding and pivoting in relation to the upper track 8a. A second end 4a2 of the upper hinge 4a is connected to the upper track 8a, and the second end 4a2 is arranged to pivot and slide in relation to the upper track 8a. The upper track 8a is connected to the door structure 2 with suitable connection means, and the upper track 8a has a configuration suitable for holding the upper hinge 4a. As shown in FIGS. 2B-2C and 3, the second end 4a2 comprises an upper pivoting and sliding member 15a, which is arranged to slide in the upper track 8a. The upper pivoting and sliding member 15a is allowed to slide in the longitudinal direction $D_{LO}$ along the upper track 8a. The upper pivoting and sliding member 15a further comprises an axis or similar structure for a pivoting movement of the second end 4a2 of the upper hinge 4a in relation to the upper track 8a. The upper pivoting and sliding member 15a has a shape and configuration suitable for a sliding movement in the upper track 8a, and the upper pivoting and sliding member 15a may be arranged with bearings or other low friction means for a smooth operation of the door structure 2. The upper track 8a may have any suitable configuration or construction.

A first end $4_{b1}$ of the lower hinge 4b is hingedly connected to the pillar structure 3a, or other structure of the vehicle body structure 3, via a suitable lower pivoting connection member 14b, such as for example a conventional hinge axis construction, as indicated in FIGS. 1A-1C. With this construction, the first end $4_{b1}$ of the lower hinge 4b can pivot in relation to the vehicle body structure 3 for displacing the door structure 2.

In the shown embodiment, the lower hinge 4b is having a curved configuration for an efficient displacement of the door structure 2 in relation to the vehicle body structure 3. As shown in FIGS. 1A-1C and 3, the first end $4_{b1}$ of the lower hinge 4b is arranged with a curved shape, such as a swan-neck like curved configuration for a compact design of the door system 2. The lower hinge 4b may have other suitable configurations if desired.

As further shown in FIGS. 1A-1C and 3, the door structure 2 comprises a lower track 8b, and the lower hinge 4b is configured for sliding and pivoting in relation to the lower track 8b. A second end 4b2 of the lower hinge 4b is connected to the lower track 8b, and the second end 4b2 is arranged to pivot and slide in relation to the lower track 8b. The lower track 8b is connected to the door structure 2 with suitable connection means, and the lower track 8b has a configuration suitable for holding the lower hinge 4b. As shown in FIG. 3, the second end 4b2 comprises a lower pivoting and sliding member 15b, which is arranged to slide in the lower track 8b. The lower pivoting and sliding member 15b is allowed to slide in the longitudinal direction $D_{LO}$ along the lower track 8b. The lower pivoting and sliding member 15b further comprises an axis or similar structure for a pivoting movement of the second end 4b2 of the lower hinge 4b in relation to the lower track 8b. The lower pivoting and sliding member 15b has a shape and configuration suitable for a sliding movement in the lower track 8b, and the lower pivoting and sliding member 15b may be arranged with bearings or other low friction means for a smooth operation of the door structure 2. The lower track 8b may have any suitable configuration or construction.

The displacement mechanism 13 further comprises an outer hinge 9, and the outer hinge 9 is hingedly connected to the door structure 2 and hingedly and slidably connected to the vehicle body structure 3, as schematically indicated in FIGS. 1A-1C and 2A-2C. The outer hinge 9 is extending between the door structure 2 and the vehicle body structure 3, and the vehicle body structure 3 comprises an outer track 10 arranged in a suitable outer position of the vehicle body structure 3. The outer hinge 9 is configured for sliding and pivoting in relation to the outer track 10, and the outer hinge 9 is configured for slidingly displacing the door structure 2 in relation to the vehicle body structure 3, and is cooperating with the upper hinge 4a and the lower hinge 4b for the displacement of the door structure 2.

A first end $9_1$ of the outer hinge 9 is hingedly connected to the door structure 2, via a suitable outer pivoting connection member 14c, such as for example a conventional hinge axis construction, as indicated in FIGS. 1B-1C and 2A-2C. With this construction, the first end $9_1$ of the outer hinge 9 can pivot in relation to the door structure 2 for displacing the door structure 2.

In the shown embodiment, the outer hinge 9 is having a straight configuration for an efficient displacement of the door structure 2 in relation to the vehicle body structure 3. The outer hinge 9 may have other suitable configurations if desired.

As further shown in FIGS. 1A-1C and 2A-2C and described above, the vehicle body structure 3 comprises the outer track 10, and the outer hinge 9 is configured for sliding and pivoting in relation to the outer track 10. A second end $9_2$ of the outer hinge 9 is connected to the outer track 10, and the second end $9_2$ is arranged to pivot and slide in relation to the outer track 10. The outer track 10 is connected to the vehicle structure 3 with suitable connection means, and the outer track 10 has a configuration suitable for holding the outer hinge 9. The second end $9_2$ comprises an outer pivoting and sliding member 15c, which is arranged to slide in the outer track 10. The outer pivoting and sliding member 15c is allowed to slide in the longitudinal direction $D_{LO}$ along the outer track 10. The outer pivoting and sliding member 15c further comprises an axis or similar structure for a pivoting movement of the second end $9_2$ of the outer hinge 9 in relation to the outer track 10. The outer pivoting and sliding member 15c has a shape and configuration suitable for a sliding movement in the outer track 10, and the outer pivoting and sliding member 15c may be arranged with bearings or other low friction means for a smooth operation of the door structure 2. The outer track 10 may have any suitable configuration or construction.

As shown in FIGS. 1A-1C and 3, the door structure 2 further comprises an upper trim panel part 11 arranged above the first trim panel part 5. The upper trim panel part 11 is forming an upper wall 12d for the recess 7. The upper trim panel part 11 is providing an aesthetically attractive interior design of the door structure 2 and is at the same time forming the upper wall 12d, where the upper wall 12d together with the first side wall 12a and the bridging wall section 12c are delimiting the recess 7.

To operate the door system 1 from the closed position $P_C$ of the door structure 2 shown in FIGS. 1A and 2A to the open position $P_O$ shown in FIGS. 1C and 2C, an opening sequence is initiated by a user of the vehicle V. The opening sequence may be initiated through actuation of an interior or exterior door handle, or through an electronic remote device, such as a key fob or a smartphone. After the initiated opening sequence, the door structure 2 is first displaced in relation to the vehicle body structure 3 from the closed position $P_C$ to the intermediate position $P_I$ shown in FIGS. 1B and 2B, and thereafter from the intermediate position $P_I$ to the open position $P_O$. The displacement of the door structure 2 from the closed position $P_C$ to the intermediate position $P_I$ is achieved through a pivoting movement of the upper hinge 4a, the lower hinge 4b, and the outer hinge 9 in relation to both the door structure 2 and the vehicle body structure 3, via the respective pivoting connection members and the respective pivoting and sliding members. Through this movement, the door structure 2 is displaced both in the lateral direction $D_{LA}$ and in the longitudinal direction $D_{LO}$, as shown in FIGS. 1B and 2B. With the displacement in the lateral direction $D_{LA}$, the door structure 2 is allowed to slide in relation to the vehicle body structure 3 in the longitudinal direction $D_{LO}$, as understood from FIGS. 2B-2C, and the door structure 2 can thus be displaced in the longitudinal direction $D_{LO}$ through a sliding movement. When displacing the door structure 2 through the sliding movement from the intermediate position $P_I$ to the open position $P_O$, the upper pivoting and sliding member 15a, the lower pivoting and sliding member 15b, and the outer pivoting and sliding member 15c, are sliding in the respective upper track 8a, the lower track 8b, and the outer track 10. In the open position $P_O$, the recess 7 is preventing the wheel W from contacting the door structure 2 as described above, and through the recess 7 the door structure 2 is allowed to move without being obstructed by the wheel W, independently of the positioning of the wheel W, as shown in FIG. 2C.

To operate the door system 1 from the open position $P_O$ of the door structure 2 shown in FIGS. 1C and 2C to the closed position $P_C$ shown in FIGS. 1A and 2A, a closing sequence is initiated by a user of the vehicle V. The closing sequence may be initiated through actuation of an interior or exterior door handle, or through an electronic remote device, such as a key fob or a smartphone. After the initiated closing sequence, the door structure 2 is first displaced in relation to the vehicle body structure 3 from the open position $P_O$ to the intermediate position $P_I$ shown in FIGS. 1B and 2B, and thereafter from the intermediate position $P_I$ to the closed position $P_C$. Since the door structure 2 has been displaced in the lateral direction $D_{LA}$ during the opening sequence, the door structure 2 is allowed to slide in relation to the vehicle body structure 3 in the longitudinal direction $D_{LO}$, as understood from FIGS. 2B-2C, and the door structure 2 can thus be displaced in the longitudinal direction $D_{LO}$ through a sliding movement. When displacing the door structure 2 through the sliding movement from the open position $P_O$ to the intermediate position $P_I$, the upper pivoting and sliding member 15a, the lower pivoting and sliding member 15b, and the outer pivoting and sliding member 15c, are sliding in the respective upper track 8a, the lower track 8b, and the outer track 10. The displacement of the door structure 2 from the intermediate position $P_I$ to the closed position $P_C$ is achieved through a pivoting movement of the upper hinge 4a, the lower hinge 4b, and the outer hinge 9 in relation to both the door structure 2 and the vehicle body structure 3, via the respective pivoting connection members and the respective pivoting and sliding members. Through this movement, the door structure 2 is displaced both in the lateral direction $D_{LA}$ and in the longitudinal direction $D_{LO}$, as shown in FIGS. 1A-1B and 2A-2B.

The pivoting and sliding movement of the door structure 2 may be activated manually by the user of the vehicle V or alternatively by actuators connected to the respective hinges and tracks. Suitable actuators may for example be electric motors and linear motors, but it should be understood that any suitable actuator or actuating system could be used. The door system 1 may further comprise a control unit controlling the actuation and movement of the door structure 2.

The present disclosure has been presented above with reference to specific embodiments. However, other embodiments than the above described are possible and within the scope of the disclosure. The above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Door system
2: Door structure
2a: Door part
3: Vehicle body structure
3a: Pillar structure
4: Hinge unit
4a: Upper hinge
$4a_1$: First end, Upper hinge
$4a_2$: Second end, Upper hinge
4b: Lower hinge
$4b_1$: First end, Lower hinge
$4b_2$: Second end, Lower hinge
5: First trim panel part
5a: First section, First trim panel part
5b: Second section, First trim panel part
6: Second trim panel part
7: Recess, First trim panel part
8a: Upper track
8b: Lower track
9: Outer hinge 9$i$: First end, Outer hinge
9$_2$: Second end, Outer hinge
10: Outer track
11: Upper trim panel part
12$a$: First side wall
12$b$: Second side wall
12$c$: Bridging wall section
12$d$: Upper wall
13: Displacement mechanism
14$a$: Upper pivoting connection member
14$b$: Lower pivoting connection member
14$c$: Outer pivoting connection member
15$a$: Upper pivoting and sliding member
15$b$: Lower pivoting and sliding member
15$c$: Outer pivoting and sliding member
$D_{LO}$: Longitudinal direction
$D_{LA}$: Lateral direction
E: Wheel envelope
G: Gap
Interior compartment
O: Opening
$P_C$: Closed position
Intermediate position
$P_O$: Open position
S: Space
$T_1$: First thickness
$T_2$: Second thickness
V: Vehicle
W: Wheel

What is claimed is:

1. A door system for a vehicle, the door system comprising a vehicle body structure and a door structure, wherein the vehicle body structure comprises an opening to an interior compartment of the vehicle, wherein the door system comprises a displacement mechanism configured for displacing the door structure in relation to the opening between an open position and a closed position, wherein the door structure in the closed position is arranged to cover at least a portion of the opening, and wherein the door structure in the open position is arranged at a distance from the closed position in a longitudinal direction of the vehicle body structure,
wherein the door structure comprises a recess configured to receive at least a section of a wheel envelope of a wheel of the vehicle when the door structure is arranged in the open position, wherein the recess in the open position is allowing a door part of the door structure covering the wheel to be arranged in close vicinity to the vehicle body structure in a lateral direction of the vehicle body structure and preventing the wheel from contacting the door structure,
wherein the door structure comprises a first trim panel part attached to the door structure and a second trim panel part movably arranged in connection to the first trim panel part, wherein the first trim panel part comprises the recess, allowing the door structure to have a close alignment to the vehicle body structure of the vehicle and preventing the wheel from contacting the first trim panel part of the door structure in the open position, and wherein the recess is configured to receive the second trim panel part such that first trim panel and the second trim panel form a substantially flat surface in the closed position.

2. The door system according to claim 1, wherein the first trim panel part and the second trim panel part are facing an interior compartment of the vehicle in the closed position, wherein the first trim panel part has an extension along the door structure in the longitudinal direction, wherein the first trim panel part comprises a first section and a second section, wherein the first section comprises the recess.

3. The door system according to claim 2, wherein the first section comprises a first side wall and the second section comprises a second side wall, wherein the first trim panel part further comprises a bridging wall section connecting the first side wall and the second side wall, wherein the recess is formed as a cut-out section of the first trim panel part defined by the first side wall and the bridging wall section.

4. The door system according to claim 2, wherein the first section has a configuration with a smaller thickness in the lateral direction compared to the second section.

5. The door system according to claim 1, wherein the second trim panel part is configured for preventing access to a space between the door structure and the vehicle body structure in the open position.

6. The door system according to claim 1, wherein the second trim panel part is aligned with the first trim panel part when the door structure is arranged in the closed position, and wherein the second trim panel part is arranged at an angle in relation to the first trim panel part when the door structure is arranged in the open position for closing a gap between the door structure and the vehicle body structure.

7. The door system according to claim 1, wherein the displacement mechanism comprises a hinge unit, wherein the hinge unit is hingedly connected to the vehicle body structure and hingedly and slidably connected to the door structure, wherein the hinge unit is configured for slidingly displacing the door structure in relation to the vehicle body structure.

8. The door system according to claim 7, wherein the second trim panel part is attached to the hinge unit and configured to move with the hinge unit when the door structure is displaced in relation to the vehicle body structure between the open position and the closed position.

9. The door system according to claim 7, wherein the hinge unit comprises an upper hinge and a lower hinge arranged between the door structure and the vehicle body structure.

10. The door system according to claim 9, wherein the upper hinge and the lower hinge are extending between the door structure and the vehicle body structure, wherein the upper hinge and the lower hinge are having curved configurations.

11. The door system according to claim 10, wherein the door structure comprises an upper track and a lower track, wherein the upper hinge is configured for sliding and pivoting in relation to the upper track, and wherein the lower hinge is configured for sliding and pivoting in relation to the lower track.

12. The door system according to claim 1, wherein the displacement mechanism further comprises an outer hinge, wherein the outer hinge is hingedly connected to the door structure and hingedly and slidably connected to the vehicle body structure, wherein the outer hinge is extending between the door structure and the vehicle body structure, wherein the vehicle body structure comprises an outer track, wherein the outer hinge is configured for sliding and pivoting in relation to the outer track, wherein the outer hinge is configured for slidingly displacing the door structure in relation to the vehicle body structure.

13. The door system according to claim 1, wherein the door structure further comprises an upper trim panel part arranged above the first trim panel part, wherein the upper trim panel part is forming an upper wall for the recess.

14. A vehicle comprising a door system according to claim 1.

15. A door system for a vehicle, the door system comprising a vehicle body structure and a door structure, wherein the vehicle body structure comprises an opening to an interior compartment of the vehicle, wherein the door system comprises a displacement mechanism configured for displacing the door structure in relation to the opening between an open position and a closed position, wherein the door structure in the closed position is arranged to cover at least a portion of the opening, and wherein the door structure in the open position is arranged at a distance from the closed position in a longitudinal direction of the vehicle body structure,
- wherein the door structure comprises a recess configured to receive at least a section of a wheel envelope of a wheel of the vehicle when the door structure is arranged in the open position, wherein the recess in the open position is configured to allow a door part of the door structure covering the wheel to be arranged in close vicinity to the vehicle body structure in a lateral direction of the vehicle body structure, and prevent the wheel from contacting the door structure,
- wherein the door structure comprises a first trim panel part attached to the door structure, the first trim panel part having an extension along the door structure in the longitudinal direction and comprising a first section having the recess, a second section, and a bridging wall connecting the first section and the second section, wherein the recess is configured to allow the door structure to have a close alignment to the vehicle body structure of the vehicle and to prevent the wheel from contacting the first trim panel part of the door structure in the open position,
- wherein the door structure comprises a second trim panel part movably arranged in connection to the first trim panel part, the second trim panel part having a cutout configured to receive the bridging wall, and
- wherein the recess receives the second trim panel part and the cutout of the second trim panel part abuts the bridging wall in the closed position.

16. A door system for a vehicle, the door system comprising a vehicle body structure and a door structure, wherein the vehicle body structure comprises an opening to an interior compartment of the vehicle, wherein the door system comprises a displacement mechanism configured for displacing the door structure in relation to the opening between an open position and a closed position, wherein the door structure in the closed position is arranged to cover at least a portion of the opening, and wherein the door structure in the open position is arranged at a distance from the closed position in a longitudinal direction of the vehicle body structure,
- wherein the door structure comprises a recess configured to receive at least a section of a wheel envelope of a wheel of the vehicle when the door structure is arranged in the open position, wherein the recess in the open position is allowing a door part of the door structure covering the wheel to be arranged in close vicinity to the vehicle body structure in a lateral direction of the vehicle body structure and preventing the wheel from contacting the door structure,
- wherein the door structure comprises a first trim panel part attached to the door structure and a second trim panel part movably arranged in connection to the first trim panel part, wherein the first trim panel part comprises the recess, and wherein the recess is configured to receive the second trim panel part in the closed position.

* * * * *